(12) United States Patent
Shi et al.

(10) Patent No.: US 11,734,725 B2
(45) Date of Patent: Aug. 22, 2023

(54) INFORMATION SENDING METHOD, APPARATUS AND SYSTEM, AND COMPUTER-READABLE STORAGE MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Hailin Shi, Beijing (CN); Tao Mei, Beijing (CN); Bowen Zhou, Beijing (CN); He Zhao, Beijing (CN); Shu Gong, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 345 days.

(21) Appl. No.: 17/054,224

(22) PCT Filed: May 16, 2019

(86) PCT No.: PCT/CN2019/087249
§ 371 (c)(1),
(2) Date: Nov. 10, 2020

(87) PCT Pub. No.: WO2019/233258
PCT Pub. Date: Dec. 12, 2019

(65) Prior Publication Data
US 2021/0157869 A1    May 27, 2021

(30) Foreign Application Priority Data
Jun. 6, 2018 (CN) .......................... 201810573612.8

(51) Int. Cl.
*G06F 16/9535* (2019.01)
*G06Q 30/0251* (2023.01)
(Continued)

(52) U.S. Cl.
CPC ..... *G06Q 30/0269* (2013.01); *G06F 16/9535* (2019.01); *G06F 16/9538* (2019.01);
(Continued)

(58) Field of Classification Search
CPC ............. G06F 16/9535; G06F 16/9536; G06F 16/9538; G06F 16/951; G06K 9/6201; G06V 10/75; G06V 30/19007
See application file for complete search history.

(56) References Cited

U.S. PATENT DOCUMENTS

| 2015/0019345 A1* | 1/2015 | Masuko | ................ G06V 10/44 |
| | | | 705/14.66 |
| 2019/0163985 A1* | 5/2019 | Wang | ..................... G06Q 30/00 |

(Continued)

FOREIGN PATENT DOCUMENTS

| CN | 105469263 A | 4/2016 |
| CN | 105894332 A | 8/2016 |

(Continued)

OTHER PUBLICATIONS

International Search Report dated Aug. 16, 2019 in PCT/CN2019/087249 (with English translation), 13 pages.
(Continued)

*Primary Examiner* — Kris E Mackes
(74) *Attorney, Agent, or Firm* — Oblon, McClelland, Maier & Neustadt, L.L.P.

(57) ABSTRACT

The present disclosure relates to an information sending method, apparatus, system and a computer readable storage medium, and pertains to the technical field of computers. The method in the present disclosure includes: analyzing
(Continued)

video data of an offline user to determine an attribute of the offline user; searching for historical access information of at least one online user matching the attribute of the offline user; and determining at least one object recommended to the offline user according to the historical access information of each of the at least one online user, and sending information of the at least one object to the offline user.

20 Claims, 5 Drawing Sheets

(51) Int. Cl.
*G06F 16/9538* (2019.01)
*G06V 20/40* (2022.01)
*G06F 18/22* (2023.01)
*G06V 10/75* (2022.01)
*G06V 20/52* (2022.01)
*G06V 40/16* (2022.01)

(52) U.S. Cl.
CPC .............. *G06F 18/22* (2023.01); *G06V 10/75* (2022.01); *G06V 20/46* (2022.01); *G06V 20/52* (2022.01); *G06V 40/169* (2022.01); *G06V 40/161* (2022.01); *G06V 40/168* (2022.01); *G06V 40/174* (2022.01); *G06V 40/178* (2022.01)

(56) References Cited

U.S. PATENT DOCUMENTS

| | | | |
|---|---|---|---|
| 2020/0090411 | A1 | 5/2020 | Zhou et al. |
| 2020/0168003 | A1 | 5/2020 | Zhou et al. |

FOREIGN PATENT DOCUMENTS

| | | | |
|---|---|---|---|
| CN | 106530001 | A | 3/2017 |
| CN | 107507017 | A | 12/2017 |
| CN | 107633430 | A | 1/2018 |
| CN | 107767217 | A | 3/2018 |
| CN | 108022152 | A | 5/2018 |
| CN | 108876526 | A | 11/2018 |
| CN | 109034973 | A | 12/2018 |

OTHER PUBLICATIONS

Combined Chinese Office Action and Search Report dated Mar. 30, 2020, in Chinese Patent Application No. 201810573612 8 (with English translation of Categories of Cited Documents), 12 pages.
Combined Chinese Office Action and Search Report dated Aug. 11, 2020, in Chinese Patent Application No. 201810573612.8, 11 pages.
Extended European Search Report dated Dec. 13, 2021 in European Patent Application No. 19814325.7, 7 pages.

\* cited by examiner

INFORMATION SENDING METHOD, APPARATUS AND SYSTEM, AND COMPUTER-READABLE STORAGE MEDIUM

CROSS REFERENCE TO RELATED APPLICATIONS

The present disclosure is a U.S. National Stage Application under 35 U.S.C. § 371 of International Patent Application No. PCT/CN2019/087249, filed on May 16, 2019, which is based on and claims priority of Chinese application for invention No. 201810573612.8, filed on Jun. 6, 2018, the disclosures of both of which are hereby incorporated into this disclosure by reference in its entirety.

TECHNICAL FIELD

The present disclosure relates to the technical field of computers, and in particular, to an information sending method, apparatus, system, and a computer-readable storage medium.

BACKGROUND

With the continuous development of Internet technologies, online consumption behaviors are more and more popular. However, online consumption cannot always replace offline consumption. People still pay attention to offline real experiences of shopping, entertainment, social contact and traveling.

Currently, offline shopping, entertainment, etc. still adopt traditional modes. For example, shopping malls, entertainment venues, and the like still rely primarily on personnel to recommend goods, entertainment options, and the like for customers. Large electronic billboards still adopt the form of randomly playing advertisements to attract the attention of customers.

SUMMARY

According to some embodiments of the present disclosure, there is provided an information sending method, comprising: analyzing video data of an offline user to determine an attribute of the offline user; searching for historical access information of at least one online user matching the attribute of the offline user; and determining at least one object recommended to the offline user according to the historical access information of each of the at least one online user, and sending information of the at least one object to the offline user.

In some embodiments, determining at least one object recommended to the offline user according to the historical access information of each of the at least one online user comprises: constructing an object recommendation set according to at least one object historically accessed by each of the at least one online user; and determining the at least one object recommended to the offline user according to a recommendation metric value of each object in the object recommendation set.

In some embodiments, constructing an object recommendation set according to at least one object historically accessed by each of the at least one online user comprises: selecting at least one object, to which the number of times of access exceeds a corresponding threshold from objects historically accessed by each of the at least one online user, to construct the object recommendation set, wherein the number of times of access is determined from at least one of the number of times of browsing, the number of times of purchase, the number of times of share, the number of times of comment, or the number of collections.

In some embodiments, the method further comprises: after constructing the object recommendation set, determining at least one candidate user group with similar access behaviors to a basic user group formed by the at least one online user as at least one additional user group, wherein all online users of an online platform are divided into different online user groups according to attribute, and the at least one candidate user group is at least one online user group not matching the basic user group in attribute; and expanding the object recommendation set according to the historical access information of the at least one additional user group.

In some embodiments, determining at least one candidate user group with similar access behaviors to a basic user group formed by the at least one online user as at least one additional user group comprises: for each candidate user group, determining a behavior similarity between the candidate user group and the basic user group, according to the number of same objects preferred by the candidate user group and the basic user group and the total number of objects respectively preferred by the candidate user group and the basic user group; and determining at least one candidate user group, the behavior similarity between which and the basic user group exceeds a behavior similarity threshold as the at least one additional user group, wherein each of the objects preferred by the candidate user group is an object, to which the recommendation metric value of the candidate user group exceeds a recommendation metric value threshold, and each of the objects preferred by the basic user group is an object, to which the recommendation metric value of the basic user group exceeds the recommendation metric value threshold.

In some embodiments, the method further comprises: after constructing the object recommendation set, for each object as a recommended object in the object recommendation set, determining at least one candidate object similar to the recommended object as at least one additional object, according to the recommendation metric value of each candidate object, wherein the candidate object is an object accessed by an online user not matching the attribute of the offline user; and adding the at least one additional object into the object recommendation set to expand the object recommendation set.

In some embodiments, determining at least one candidate object similar to the recommended object as at least one additional object, according to the recommendation metric value of each candidate object comprises: for each candidate object, determining a similarity between the candidate object and the recommended object according to the number of user groups preferring the candidate object, the number of user groups preferring the recommended object and the number of user groups preferring both the candidate object and the recommended object; and determining at least one candidate object, the similarity between which and the recommended object exceeds an object similarity threshold as the at least one additional object, wherein the number of the user groups preferring the candidate object is the number of user groups of which the recommendation metric value to the candidate object exceeds the recommendation metric value threshold, and the number of user groups preferring the recommended object is the number of user groups of which the recommendation metric value to the recommended object exceeds the recommendation metric value threshold.

In some embodiments, the method further comprises: selecting at least one object associated with the attribute of the offline user, and recommending the at least one object to the offline user.

In some embodiments, the recommended metric value of each object is determined from at least one of the number of times of access to the object by the at least one online user, feedback information from the at least one online user to the object, a habit matching degree of the object with the offline user, or a price of the object, wherein the higher the number of times access to the object, the higher the recommendation metric value of the object; the better the feedback from the at least one online user to the object, the higher the recommendation metric value of the object; the higher the habit matching degree of the object with the offline user, the higher the recommendation metric value of the object; the lower the price of the object, the higher the recommendation metric value of the object.

In some embodiments, the at least one online user is at least one online user, of which a distance from a location of the offline user is within a first preset range; or the attribute of each of the at least one online user is determined from an image of the online user acquired on an online platform and registration information of the online user on the online platform.

In some embodiments, the method further comprises: sending at least one of the attribute of the offline user or the at least one object recommended to the offline user to a display device for display.

In some embodiments, the method further comprises: determining at least one recommended object according to historical access information of at least one online user, of which a distance from a display device is within a second preset range, and sending the at least one recommended object to the display device for display, in a case that there is no offline user or the attribute of the offline user cannot be determined.

According to still other embodiments of the present disclosure, there is provided an information sending apparatus comprising: a processer; and a memory coupled to the processor and storing instructions that when executed by the processor, cause the processor to: analyze video data of an offline user to determine an attribute of the offline user; search for historical access information of at least one online user matching the attribute of the offline user; and determine at least one object recommended to the offline user according to the historical access information of each of the at least one online user, and send information of the at least one object to the offline user.

In some embodiments, determining at least one object recommended to the offline user according to the historical access information of each of the at least one online user comprises: constructing an object recommendation set according to at least one object historically accessed by each of the at least one online user; and determining the at least one object recommended to the offline user according to a recommendation metric value of each object in the object recommendation set.

In some embodiments, constructing an object recommendation set according to at least one object historically accessed by each of the at least one online user comprises: selecting at least one object, to which the number of times of access exceeds a corresponding threshold from objects historically accessed by each of the at least one online user, to construct the object recommendation set, wherein the number of times of access is determined from at least one of the number of times of browsing, the number of times of purchase, the number of times of share, the number of times of comment, or the number of collections.

In some embodiments, the memory further storing instructions which, when executed by a processor, cause the processor to: after constructing the object recommendation set, determine at least one candidate user group with similar access behaviors to a basic user group formed by the at least one online user as at least one additional user group, wherein all online users of an online platform are divided into different online user groups according to attribute, and the at least one candidate user group is at least one online user group not matching the basic user group in attribute; and determining the at least one object recommended to the offline user according to a recommendation metric value of each object in the object recommendation set.

In some embodiments, determining at least one candidate user group with similar access behaviors to a basic user group formed by the at least one online user as at least one additional user group comprises: for each candidate user group, determining a behavior similarity between the candidate user group and the basic user group, according to the number of same objects preferred by the candidate user group and the basic user group and the total number of objects respectively preferred by the candidate user group and the basic user group; and determining at least one candidate user group, the behavior similarity between which and the basic user group exceeds a behavior similarity threshold as the at least one additional user group, wherein each of the objects preferred by the candidate user group is an object, to which the recommendation metric value of the candidate user group exceeds a recommendation metric value threshold, and each of the objects preferred by the basic user group is an object, to which the recommendation metric value of the basic user group exceeds the recommendation metric value threshold.

According to still further embodiments of the present disclosure, there is provided a non-transitory computer-readable storing computer programs, when executed by a processor, cause the processor to: analyze video data of an offline user to determine an attribute of the offline user; search for historical access information of at least one online user matching the attribute of the offline user; and determine at least one object recommended to the offline user according to the historical access information of each of the at least one online user, and send information of the at least one object to the offline user.

According to still other embodiments of the present disclosure, there is provided an information sending system comprising: the information sending apparatus of any of the preceding embodiments; a camera configured to acquire the video data of the offline user and input the video data into the information sending apparatus; and a display device configured to receive at least one of the attribute of the offline user or the at least one object recommended to the offline user outputted by the information sending apparatus, and display it to the offline user.

In some embodiments, the system further comprises: an online data storage device configured to store attributes and historical access information of online users, and provide an interface to the information sending apparatus, so that the information sending apparatus searches for the historical access information of at least one online user matching the attribute of the offline user.

The other features of the present disclosure and advantages thereof will become clear through a detailed description of the exemplary embodiments of the present disclosure with reference to the accompanying drawings below.

BRIEF DESCRIPTION OF THE DRAWINGS

The accompanying drawings which constitute a part of the specification provide a further understanding of the present disclosure, and together with the illustrative embodiments of the present disclosure and the description, serve to explain the principle of the present disclosure but not to limit the present disclosure, in which.

DETAILED DESCRIPTION

The technical solutions in the embodiments of the present disclosure are now described clearly and completely in conjunction with the accompanying drawings in the embodiments of the present disclosure, and it is obvious that the embodiments described are only some embodiments of the present disclosure, rather than all embodiments. The following description of at least one exemplary embodiment is merely illustrative in nature and by no means serves as any restriction to the present disclosure and its application or use. All other embodiments, which can be derived by a person skilled in the art from the embodiments disclosed herein without making any creative effort, shall fall within the protection scope of the present disclosure.

The inventors found that at present, traditional offline object recommendation modes cannot make recommendations according to characteristics of users, and the recommended objects are inaccurate.

One technical problem to be solved by the present disclosure is how to recommend an object for an offline user, to improve the accuracy of object recommendation and improve user experience.

The present disclosure provides an information sending method, which can be used to recommend an object to an offline user, and is described below with reference to FIG. 1.

Figure 1:
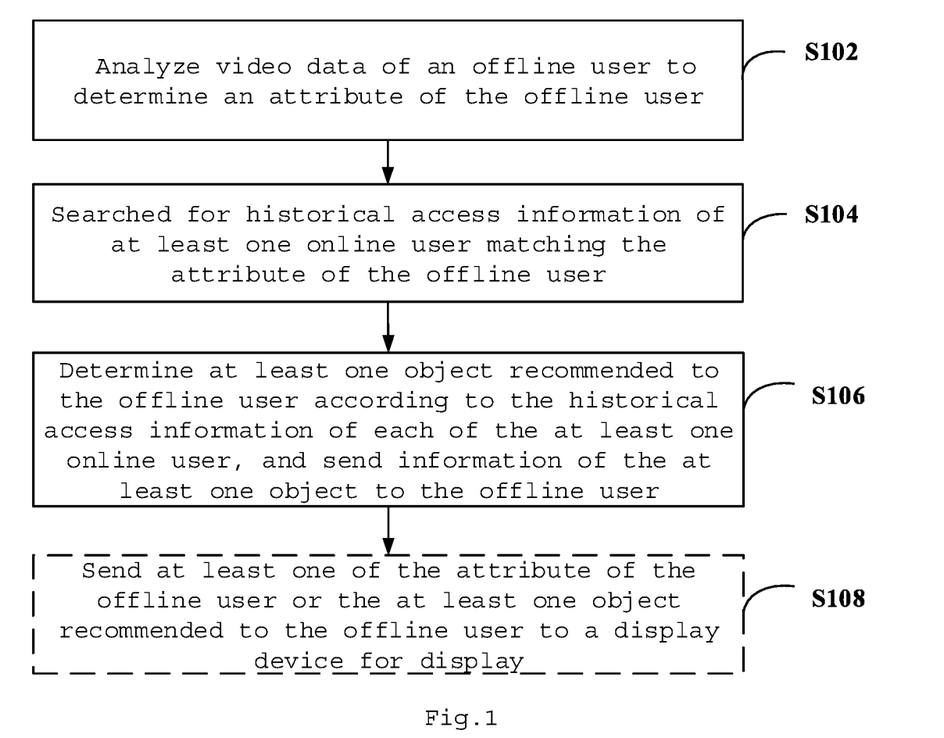
FIG. 1 shows a flow diagram of an information sending method according to some embodiments of the present disclosure.

FIG. 1 is a flow diagram of some embodiments of an object recommendation method of the present disclosure. As shown in FIG. 1, the method of the embodiments comprises: steps S102 to S106.

In step S102, video data of an offline user is analyzed to determine an attribute of the offline user.

For example, a camera can be arranged near a shop or a billboard to acquire an image of at least one offline user. At least one face area can be located by detecting video data acquired by the camera by adopting a face detection technology. Information of the face area is input into a deep learning model, and the attribute of each of the at least one offline user is output. The deep learning model is obtained by training a large number of images of face areas marked with attributes. Any face attribute analysis algorithm in the prior art can used to determine the attribute of each offline user and details thereof are not repeated here.

The attribute of the offline user comprises, for example, at least one of basic user characteristics such as age, gender, race, appearance. Further, the attribute of the offline user may further comprises at least one of additional user characteristics, such as at least one of expression, wearing glasses or not, wearing sunglasses or not, wearing a mask or not, and wearing a beard or not. The attribute of the offline user to be determined may be selected according to actual needs, and are not limited to the above examples.

Specifically, for example, a plurality of age groups may be divided, and which age group the offline user belongs to can be determined; the gender is divided into male and female, and which gender the offline user is can be determined; the race is divided into yellow, black and white, and which race the offline user belongs to can be determined. Further, it can also be determined whether the expression of the offline user is a good mood or a bad mood, whether the offline user wears glasses, whether the offline user wears sunglasses, whether the offline user wears a mask, whether the offline user wear a beard, and the like. A specific numerical value can be assigned to each characteristic, for example, the gender of male is represented by 1, and the gender of female is represented by 0. For each offline user, the corresponding attribute can be represented by an attribute vector, wherein each item in the vector represents a value of one characteristic of the user. For example, an attribute vector (2,1,1,1, 0,1,0) of the offline user A indicates that the user is 30 to 40 in age, male, yellow, wearing glasses, not wearing sunglasses, wearing a mask, and not wearing a beard.

In some embodiments, the image of a preset person other than the offline user in the acquired image may be removed according to a face detection technology. For example, images of shop assistants, security guards, and the like of a shop may be stored in advance, and images of these persons may be eliminated when being acquired through a face detection technology, to be not used for subsequent attribute recognition and object recommendation process. This can further reduce the calculation amount and improve the efficiency.

In step S104, historical access information of at least one online user matching the attribute of the offline user is searched for.

In order to further improve the accuracy of object recommendation for the offline user, part of online users of an online platform can be selected according to geographical characteristics of the offline users. By acquiring the attributes and the historical access information of the part of online users for subsequent object (e.g., commodities, entertainment options, tourist attractions and etc.) recommendation, the data processing amount can be reduced, and the efficiency of object recommendation can be improved.

In some embodiments, the at least one online user is at least one online user, of which a distance from a location of the offline user is within a first preset range. For example, when recommending a commodity for an offline user in a certain market of Beijing, at least one online user in Beijing may be selected, and subsequent commodity (object) recommendation may be made according to relevant information of the at least one online user in Beijing. The address of each online user can be determined from information such as an registered address on the online platform, a common delivery address or an address positioned by the network IP address of the online user. Because users in different regions generally have regional characteristics, it is more accurate to recommend objects for offline users according to data of the online users in the same region. The use of data of the at least one online user within a certain distance range is for analyzing consumption habits and preferences of people in several kilometers around a local place such as the shop where the online user is in, or attributes of local people, for subsequent object recommendation, so that the object recommendation can more attract the offline user's attention, and the recommendation is more accurate.

The attribute of each online user is determined, for example, from an image and registration information of the online user acquired on the online platform. The face attribute analysis can be processed on the image acquired for each online user to determine the attribute, which is similar to the attribute determination method of the offline user. Further, the registration information of each online user may include: age, gender, etc., for attribute determination. The attribute of each online user can be determined in advance and offline, and can be directly called.

In step S106, at least one object recommended to the offline user is determined from the historical access information of each of the at least one online user, and information of the at least one object is send to the offline user.

Objects in the present disclosure may be but are not limited to commodities, entertainment options, or tourist attractions, etc. For example, for a place such as a shop, a commodity can be recommended to the offline user based on historical shopping data of the at least one online user. The commodity is not limited to physical commodity and may include virtual electronic commodity such as a telephone package, an electronic book, a video, news, and the like. For example, in an entertainment venue such as KTV for offline singing, a song may be recommended to the offline user based on historical access information such as songs listened to, downloaded, and sung online by the at least one online user. For example, according to information such as comments to tourist attractions of the at least one online user, a tourist attraction is recommended to the offline users in public places, and so on.

After the attributes of the offline user and each online user are determined, at least one online user with the same or similar attribute to the offline user can be determined through attribute matching (for example, comparing attribute vectors), and an object is recommended to the offline user according to historical access information of each online user with the same or similar attribute to the offline user. For example, commodities purchased by the at least one online user may be recommended to the offline user. An object may be recommended to the offline user based on the historical access information of one or more online users. The information of the object can be recommended to the offline user in the form of a short message, a voice, an electronic screen display and the like.

The historical access information, namely, the information accessed by the online user on the online platform, includes, for example, at least one of history browsing information, history purchasing information, history sharing information, history comment information or history collection information. An object that the online user have browsed, purchased, shared, commented on better, or collected etc. may be recommended to the offline user.

In the method of the embodiments, video data of the offline user is analyzed to determine the attribute of the offline user, historical access information of at least one online user matching the attribute of the offline user is searched for by matching the attribute of each online user with that of the offline user, thereby an object is recommended to the offline user according to the historical access information of the at least one online user. The solution of the present disclosure opens up online and offline data, effectively combines the online and offline data, and can improve the accuracy of object recommendation. By means of recommending an object to the offline user according to the historical access record of each online user, without the need of gathering extra information of other offline users through value-added services and marketing activities offline, privacy of the online and offline users is kept secret, and users' experience are improved.

In addition, the solution of the above embodiment of combining an online big data analysis with an offline user face attribute analysis, which compared with the solution of recommending an object purely by acquiring face features of the offline user one time, further improves the accuracy of object recommendation, and utilizes the attribute of the offline user obtained through the face attribute analysis more efficiently.

Further, as shown in FIG. 1, after step S106, the method may further comprise: step S108.

In step S108, at least one of the attribute of the offline user or the at least one object recommended to the offline user are send to a display device for display, so as to attract the attention of the offline user and other offline users.

The display device is, for example, a display screen installed in an offline place such as a shopping mall or a retail store where people flow a lot. By means of the curiosity of offline users on the artificial intelligence and the accurate object recommendation in the present disclosure, the users can be attracted to produce a behavior to access the recommended object, for example, the users are attracted to enter a shopping mall for shopping, and the users' experience is improved.

In some embodiments, at least one recommended object is determined from historical access information of at least one online user, of which a distance from a display device is within a second preset range, and the at least one recommended object is send to the display device for display, in a case that there is no offline user or the attribute of the offline user cannot be determined.

For example, when no crowd passes through the camera or the display device, or the attribute of the offline user cannot be determined, a recommended commodity may be played based on shopping information of at least one online user, of which a distance from the display device is within a second preset range. That is, play or take turns to play advertisements of some commodities that local people like, the recommendation, of which is based on online shopping records. The recommendation is preferred by local people on the one hand and helps promote local special brands on the other hand, which improves utilization of the billboard, and can attract the attention of customers.

The camera may only acquire images of one offline user, and this solution can be directly utilized to recommend an object for the offline user. The camera can also simultaneously acquire images of a plurality of offline users, and particularly in a scene of a large shopping mall, the camera will simultaneously acquire images of many offline users in the case of a large flow of customers. In the case that the camera simultaneously acquire images of multiple offline users, the offline users may be divided into one or more offline user groups according to the attributes of the offline users, and attributes corresponding to the offline user groups are determined, to subsequently recommend objects for the user groups. That is, the offline user may be an offline user group.

For example, Euclidean distances between different offline users may be calculated according to attribute vectors of the offline users, and users whose distances are less than a threshold may be divided into an offline user group. Or, the offline users are divided into different offline user groups by using a clustering algorithm. The number of offline user groups to be divided can be set according to actual needs. The method for recommending objects for different offline user groups is particularly suitable for the scene of pushing advertisements by a large billboard, and a large number of users with the same or similar attributes can be classified into one offline user group to push the advertisements in a targeted manner.

The attribute corresponding to one offline user group may be determined from an average value of attribute values of the users therein. For example, user attribute vectors in one offline user group are averaged, and a corresponding threshold is set for the characteristic value corresponding to each characteristic. The average value of each characteristic value is compared with the corresponding threshold so as to distinguish a specific characteristic represented by the characteristic value. For example, the threshold of the characteristic value corresponding to gender is set to 0.5, and if the average value is greater than the threshold, the gender characteristic of the offline user group is determined to be male, otherwise, be female. Or, the attribute corresponding to one offline user group is determined from the number of users corresponding to each characteristic value. For example, as to the gender characteristic, if the number of users with the characteristic value of male is greater that of female, the gender characteristic of the user group is determined to be male. In practical applications, the characteristic of the offline user group may be determined in other manners, which are not limited to the illustrated examples.

In the case that the camera simultaneously acquire images of multiple offline users, the video data of the offline users is analyzed to determine the attribute of at least one offline user group. Historical access information of at least one online user matching the attribute of the offline user group is searched for, and an object to be recommended to the offline user group is determined from the historical access information of each online user, and information of the object is send to the offline user.

According to the method of the above embodiment, object recommendation can be directed to both individuals and groups, which solves the practical problem of a lot of people in public places. By constructing a mapping from some attribute of an offline group to object types commonly favored by an online group through an online big data algorithm and online historical access records, recommendation to the offline group is performed through attribute matching of online and offline users.

The present disclosure provides some embodiments regarding how to determine an object recommended to the offline user according to the historical access information of each of the online users, which are described below with reference to FIGS. 2 to 3.

Figure 2:
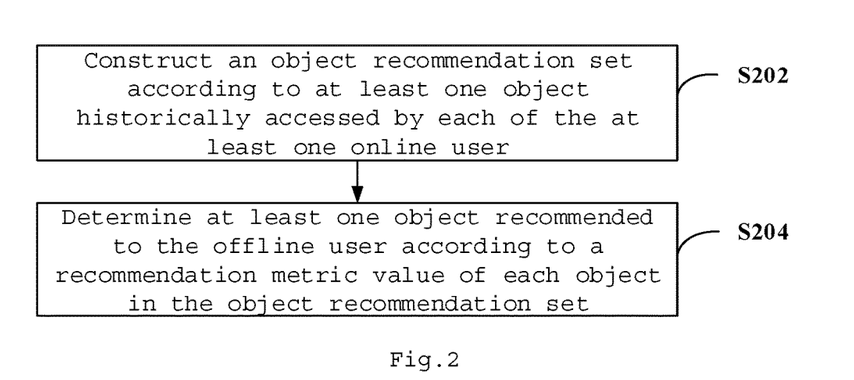
FIG. 2 shows a flow diagram of an information sending method according to some other embodiments of the present disclosure.

FIG. 2 is a flow chart of some other embodiments of an object recommendation method according to the present disclosure. As shown in FIG. 2, step S106 comprises: steps S202 to S204.

In step S202, an object recommendation set is constructed according to at least one object historically accessed by each of the at least one online user.

The attributes of the online users may not include characteristics such as whether to wear sunglasses, whether to wear a mask, etc. In attribute matching, the attributes of the online users can be matched. There are a huge number of online users, and the online users can be divided into online user groups in advance according to the attributes of the online users. For example, at least one online user with the same attribute are classified into one online user group. In some embodiments, the object recommendation set is constructed according to the historical access information of a online user groups having the same attribute as the offline user. An online user group having the same attribute as the offline user may be used as a basic user group.

In some embodiments, at least one object, to which the number of times of access exceeds a corresponding threshold is selected from objects historically accessed by the basic user group, to construct the object recommendation set. For example, the number of times of access is determined from at least one of the number of times of browsing, the number of times of purchase, the number of times of share, the number of times of comment or the number of collections. The corresponding thresholds can be set respectively for different access types, and as long as the number corresponding to one of the access types exceeds the corresponding threshold, the accessed object is added into the object recommendation set. Or the numbers corresponding to various access types can be summed up, to be compared with the corresponding threshold so as to determine whether to add the accessed object into the object recommendation set. Corresponding weights can also be respectively set for different access types, for example, a weight for comment is the largest, a weight for visit is the smallest, and weighted summation of the numbers corresponding to various access types is compared with the corresponding thresholds so as to determine whether to add the accessed object into the object recommendation set.

Also according to an attention degree (namely recommendation metric value) of the basic user group to various objects, objects with the attention degree exceeding an attention degree threshold may be added into the object recommendation set. The method of determining an attention degree of the user to an object will be described in the next step.

In step S204, at least one object recommended to the offline user is determined from a recommendation metric value of each object in the object recommendation set.

The attention degree (i.e. the recommendation metric value) of each object is determined from at least one of the number of access to the object by the at least one online user (the basic user group), feedback information from the at least one online user (the basic user group) to the object, a habit matching degree of the object with the offline user, or a price of the object. The number of times of access may be determined from the number of times of access of one or more access types as in the preceding embodiments, and the number of times of access may be, for example, a sum, or a weighted summation of the numbers corresponding to the multiple access types. For example, the feedback information from the at least one online user (the basic user group) to the object includes: comment information, customer service consultation information and the like of the at least one online user on the object. The habit matching degree of the object with the offline user can be determined from the matching of information such as regional customs in a place where the object and the offline user are in, and can be determined in advance according to statistics of a large amount of data. The habit matching degree of the object with the offline user is mainly determined from habits of users near the region where the offline user is in. For example, the northern people like eating sweet zongzi, and the southern people like eating salty zongzi, then in a case that the offline user is a northern user, sweet zongzi has a higher habit matching degree with the offline user. In addition, when close to Dragon Boat Festival, zongzi has a higher habit matching degree with the offline user.

The higher the number of times access to the object, the higher the recommendation metric value of the object; the better the feedback from the at least one online user to the object, the higher the recommendation metric value of the object; the higher the habit matching degree of the object with the offline user, the higher the recommendation metric value of the object; the lower the price of the object, the higher the recommendation metric value of the object. The number of times of access to the object, the feedback information from the at least one online user (the basic user group) to the object, the habit matching degree of the object with the offline user, and the price of the object can be respectively quantized and corresponding values are assigned thereto, and corresponding weights are respectively set for the four items of information. The weighted summation of the values corresponding to the four items of information is obtained to determine the attention degree (i.e. recommendation metric value) of the object. For example, the number of times of access to the object is directly used as the corresponding value obtained by quantifying the number of times of access. A ratio of the number of good comments to the total number of comments of the object corresponding to the basic user group is used as a feedback score obtained by quantifying the feedback information from the object by the online users (the basic user group). A matching degree correspondence is established between a season and/or geographical position and the object, and different matching degree grades are classified. The matching degree grade of the object is inquired according to the geographical position and/or season where the offline user is in, wherein different matching degree grades correspond to different values. A ratio of the feedback score to the price is taken as a value obtained by quantifying the price of the object, and the like. Values corresponding to different information can be normalized, and are not limited to the illustrated examples.

The object recommendation set is determined from the historical access records of the basic user group, and therefore the attention degree of each object in the object recommendation set may be the attention degree of the basic user group to the object. That is, for each object in the object recommendation set, the attention degree to the object may be determined by referring to at least one of the number of times of access to the object by the basic user group, the feedback information from the basic user group on the object, the habit matching degree of the object and with the basic user group, or the price of the object.

In a case that there is no offline user or the attribute of the offline user cannot be determined, at least one recommendation object is determined from historical access information of at least one online user, of which a distance from a display device is within a second preset range. When an recommended object is determined at this time, a recommended metric value of the object can be determined from at least one of the number of times of access to the object by all online users, the feedback information to the object by all online users, the habit matching degree of the object with online users, of which a distance from the display device is within the second preset range, or the price of the object, and an object whose recommendation metric value is higher than a preset metric value is selected as the recommended object.

After the attention degree (i.e., the recommendation metric value) of each object is determined, at least one object with the attention degree exceeding an attention degree threshold can be selected and recommended to the offline user. When the attention degree to each object is determined from one item of information, the recommendation method may be, selecting an object to which the number of times of access exceeds a number threshold to be recommended to the offline user, selecting an object whose feedback by the at least one online user (the basic user group) is best to be recommended to the offline user, selecting an object whose habit matching degree with the offline user is highest to be recommended to the offline user, or selecting an object whose performance-price ratio (a ratio of the feedback score to price) exceeds a corresponding performance-price ratio threshold to be recommended to the offline user. How to set the thresholds and how to select the recommended object may be set according to actual needs, and are not limited to the illustrated examples.

In the method of the above embodiment, the at least one online user with the same attribute as the offline user is selected, and an object is recommended to the offline user according to the historical access records of the at least one online user and the attention degree of each object. Because the attribute of the online user and that of the offline user are the same, it is more likely that the two have similar preferences. Further, a more popular object can be recommended for the offline user according to the attention degree to the object, so as to improve the accuracy of object recommendation, bring more attention to the offline user, and improve the user's experience.

In the above embodiments, the object recommendation set is constructed mainly with reference to the historical access information of the basic user group with the same attribute as the offline user, so as to recommend an object to the offline user, and in order to further enrich the content recommended for the object, the present disclosure further provides some other embodiments regarding how to construct the object recommendation set, which are described below with reference to FIG. 3.

Figure 3:
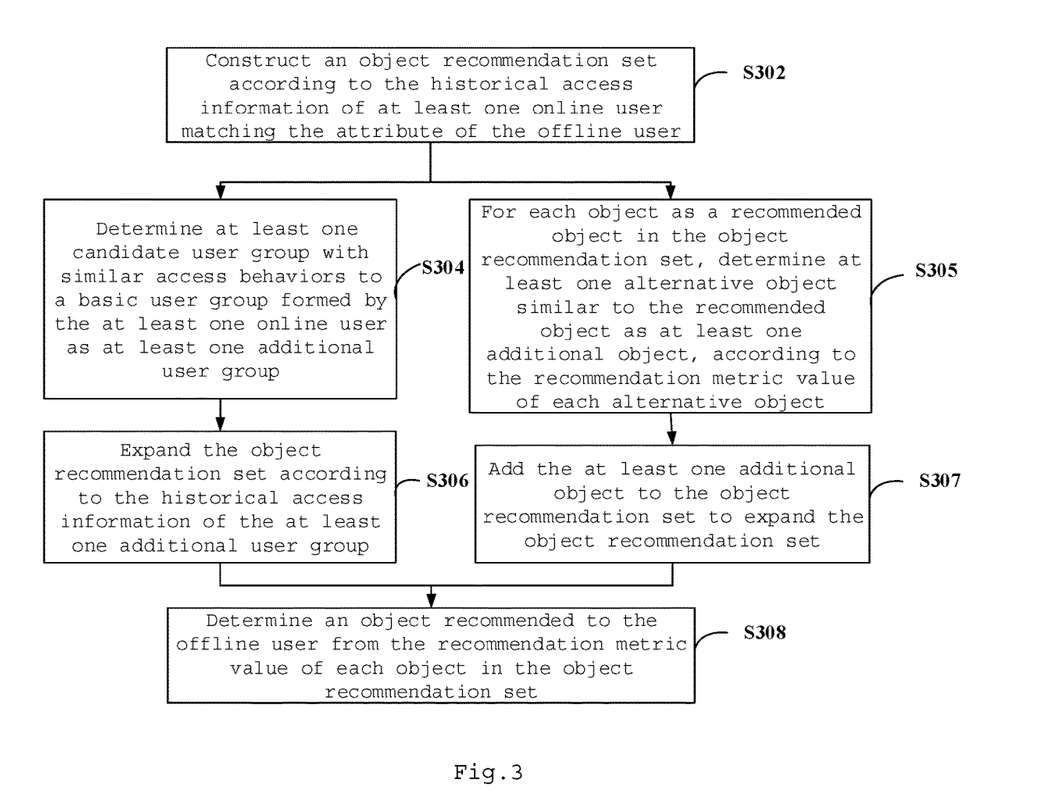
FIG. 3 shows a flow diagram of an information sending method according to further embodiments of the present disclosure.

FIG. 3 is a flow chart of further embodiments of an object recommendation method according to the present disclosure. As shown in FIG. 3, step S106 comprises: steps S302 to S308.

In step S302, an object recommendation set is constructed according to the historical access information of at least one online user matching the attribute of the offline user.

In step S304, at least one candidate user group with similar access behaviors to a basic user group formed by the at least one online user is determined as at least one additional user group.

All online users of an online platform are divided into different online user groups according to attribute, and the at least one candidate user group is at least one online user group not matching the basic user group in attribute.

The higher a ratio of the number of same objects preferred by one candidate user group to the basic user group, the higher the behavior similarity of the two user groups. In some embodiments, for each candidate user group, a behavior similarity between the candidate user group and the basic user group is determined from the number of same objects preferred by the candidate user group and the basic user group (for example, the user group A prefers lipstick, and the user group B also prefers lipstick) and the total number of objects respectively preferred by the candidate user group and the basic user group. At least one candidate user group the behavior similarity between which and the basic user group exceeds a behavior similarity threshold is determined as the at least one additional user group. Each of the objects preferred by the candidate user group is an object, to which the recommendation metric value of the candidate user group exceeds a recommendation metric value threshold, and each of the objects preferred by the basic user group is an object, to which the recommendation metric value of the basic user group exceeds the recommendation metric value threshold.

For example, the behavior similarity between one candidate user group and the basic user group may be determined as follows: the number of same commodities preferred by the candidate user group and the basic user group is N, a product of the commodities preferred by the candidate user group and the basic user group respectively is M, and a ratio of N to a square root of M is taken as the behavior similarity between the candidate user group and the basic user group. For another example, the behavior similarity between one candidate user group and the basic user group may be determined as follows: the number of same commodities preferred by the candidate user group and the basic user group is N, a union of commodity sets respectively preferred by the candidate user group and the basic user group is S, the number of the commodities in the union is L, and a ratio of N to L is taken as the behavior similarity between the candidate user group and the basic user group. The method for calculating the behavior similarity between the candidate user group and the basic user group may be determined from actual situations, and is not limited to the illustrated examples.

In step S306, the object recommendation set is expanded according to the historical access information of the at least one additional user group.

For example, an object, to which the attention degree (i.e., recommendation metric value) of the additional user group exceeds a preset attention degree may be added to the object recommendation set. For another example, for each object accessed by the additional user group, a product of the behavior similarity between the additional user group and the basic user group and the attention degree of the additional user group to the object may be calculated as a predicted attention degree of the additional user group to the commodity, and the object whose predicted attention degree exceeds the corresponding threshold may be added to the object recommendation set. The step is not limited to the examples given.

In step S308, an object recommended to the offline user is determined from the recommendation metric value of each object in the object recommendation set.

Since the object added to the object recommendation set is likely to be an object infrequently visited by the basic user group, when the object is selected according to the attention degree in this step, the attention degree to the object may be calculated for each object by using all the online user data, or the attention degree to the object may be calculated by using the data of the basic user group and the additional user group, instead of using the data of only the basic user group.

In some embodiments, in parallel with step S304, step S106 may further comprise: step S305-S307.

In step S305, for each object as a recommended object in the object recommendation set, at least one candidate object similar to the recommended object is determined as at least one additional object, according to the recommendation metric value of each candidate object.

The recommended object is an object in the object recommendation set, and the candidate object is an object accessed by the online users with a different attribute from the offline user. To further reduce the amount of data, the candidate object may be determined as an object accessed by the online users with a different attribute from the offline user and having an attention degree exceeding a certain threshold.

The more similar of attention one candidate object is to one recommended object, the higher the similarity between the two objects. In some embodiments, for each recommended object and each candidate object, a similarity between the candidate object and the recommended object is determined from the number of user groups preferring the candidate object, the number of user groups preferring the recommended object and the number of user groups preferring both the candidate object and the recommended object (for example, the number of user groups that prefer both the candidate commodity A and the recommended commodity B); and at least one candidate object the similarity between which and the recommended object exceeds an object similarity threshold is determined as the at least one additional object. The number of user groups preferring the object is the number of user groups whose attention degree to the object exceeds the corresponding attention degree threshold. The attention degree of the user group to the object can be determined with reference to the preceding embodiments.

For example, the similarity between one candidate commodity and one recommended commodity can be determined as follows. The number of user groups which prefer both the candidate commodity and the recommended commodity is n, a product of the number of user groups which prefer the candidate commodity and the number of user groups which prefer the recommended commodity is m. A ratio of n to a square root of m is taken as the similarity between the candidate commodity and the recommended commodity. For another example, the similarity between one candidate commodity and one recommended commodity may be determined as follows. The number of the user groups which prefer both the candidate commodity and the recommended commodity is n, a union of the user groups which prefer the candidate commodity and the user groups which prefer the recommended commodity is S, the number of user groups in the union is l, and a ratio of n to l is taken as the similarity between the candidate commodity and the recommended commodity. The method for calculating the similarity between one candidate commodity and one recommended commodity may be determined from actual situations and is not limited to the illustrated examples.

In step S307, the at least one additional object is added to the object recommendation set to expand the object recommendation set.

Step S307 may be executed in parallel with step S306.

For example, for each additional object, a product of the similarity between the additional object and the corresponding recommended object and the attention degree (i.e., a recommendation metric value) of the basic user group to the corresponding recommended object may be calculated as a predicted attention degree of the basic user group to the additional object, and the additional object whose predicted attention degree exceeds a corresponding threshold is added to the object recommendation set. The step is not limited to the examples given.

Similarly, the additional object is likely to be an object not frequently accessed by the basic user group, and therefore, when at least one candidate object is selected as the additional object according to the attention degree in step S305, the attention degree of each candidate object may be calculated by using all the online user data.

In some embodiments, the object recommendation set may also be expanded with at least one object associated with the at least one object in the object recommendation set. The association between two objects can be determined by a probability that both appear in the same order, the same song list, or the same comment. For example, a ratio of the number of orders including the two commodities at the same time to the total number of orders within a preset time is calculated, and a commodity whose ratio exceeds a corresponding threshold is taken as an associated commodity. Or, an accessory commodity may be recommended as an associated commodity. For example, if the object recommendation set includes a mobile phone, then a mobile phone film, an earphone, a mobile phone shell, and the like may all be the associated commodities. An association mapping of the object can be extracted, to directly expand the object recommendation set according to the mapping relation.

In some embodiments, an object in the object recommendation set that is highly sensitive to user privacy (a commodity that the user is not willing to publicly purchase) may be eliminated, avoiding a poor experience for the user.

The method of constructing the object recommendation set in each of the embodiments may be implemented offline. That is, the object recommendation set is constructed in advance to form a mapping relation between the attribute of the online users and the object recommendation set, and after the attribute of offline user is determined, the object recommendation set is directly called by matching the attribute of the online users and the attribute of the offline user. Similarly, the attention degree (the recommendation metric value) to the object may also be calculated offline, and the objects in the object recommendation set may be ranked from high to low according to the attention degree, or an object whose attention degree does not meet a preset condition in the object recommendation set is deleted, and only objects whose attention degree meets the preset condition are retained. Namely, the solution of the present disclosure can be as follows: analyzing video data of an offline user to determine an attribute of the offline user; searching for at least one online user group matching the attribute of the offline user and each object recommendation set corresponding to each online user group; and recommending an object to the offline user according to each object recommendation set.

After a large number of online users are grouped according to attribute, the number of user groups with a lower order of magnitude will be obtained, so that a mapping between the object recommendation set and the attribute can be quickly constructed, and the time consumed in inquiring the mapping relation is very short. A long time of mapping construction and inquiry for a single user in the past is saved. In addition, by updating and saving the mapping between online user attributes and object recommendation sets at the server regularly, the real-time performance and the accuracy of recommendation are guaranteed.

The method of the embodiments can further enrich the objects recommended to the offline user, and recommending the objects to the user based on the similarity of the user groups or the objects improves the accuracy of recommendation and the user experience.

Except for the solutions of recommending at least one object to the offline user based on online user data in the above embodiments, some other solutions are provided for recommending objects for the offline user.

Figure 4:
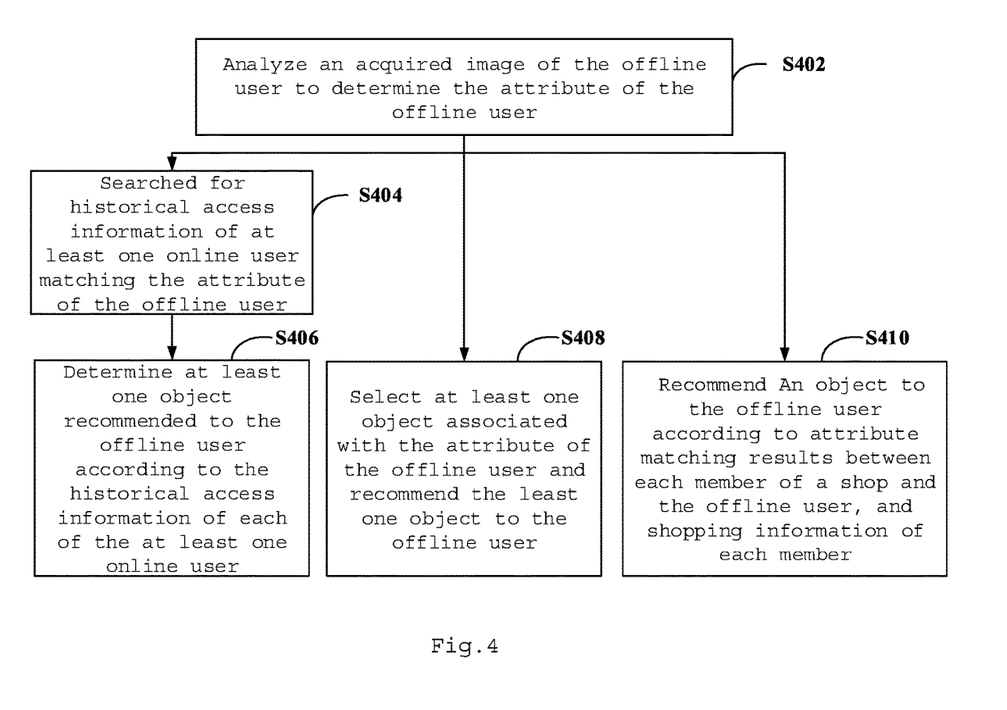
FIG. 4 shows a flow diagram of an information sending method according to still further embodiments of the present disclosure.

FIG. 4 is a flowchart of still further embodiments of a commodity recommendation method according to the present disclosure. As shown in FIG. 4, the method of the embodiments comprises: S402 to S410.

In step S402, an acquired image of the offline user is analyzed to determine the attribute of the offline user.

In step S404, historical access information of at least one online user matching the attribute of the offline user is searched for.

In step S406, at least one object recommended to the offline user is determined from the historical access information of each of the at least one online user.

In step S408, at least one object associated with the attribute of the offline user is selected and recommended to the offline user.

For such additional user characteristics as whether to wear glasses, whether to wear sunglasses, whether to wear a mask, whether to wear a beard, for each additional user characteristic, a mapping between the additional user characteristic and the corresponding at least one object to be recommended may be established in advance, and the corresponding at least one object to be recommended may be taken as an object associated with the additional user characteristic. If the offline user's attribute comprises this characteristic, the object associated with the additional user characteristic of the offline user may be recommended directly. For example, the user has a beard and a shaver may be recommended.

Images can be acquired in real time for determining such an additional user characteristic of the expression of the user. An object to be recommended may be further selected according to the expression of the user. If the user seeing the recommended commodity shows an expression of good mood, associated or similar objects can be further recommend, and if the user seeing the recommended commodity shows an expression of bad mood, the object type can be changed to recommend again. The associated or similar objects may be determined from the method of the preceding embodiments.

In step S410, an object is recommended to the offline user according to attribute matching results between each member of a shop and the offline user, and shopping information of each member.

Generally a shop will save member information and shopping records of the members, and for the members, attribute analysis and determination of recommended object, etc. can be performed by adopting the same processing method as that of the online users, and details are not repeated herein.

Face attribute analysis of the offline user can determine whether the offline user is a shop member, and if so, similar or associated objects can be recommended to the offline user according to his historical shopping records.

Steps S408 and S410 may be performed in parallel with step S406.

The method of the embodiments is more suitable fora commodity recommendation scene, can further enrich the commodities recommended for the offline user, and improves user experience.

The present disclosure further provides an information sending apparatus, which is described below with reference to FIGS. 5 and 6.

Figure 5:
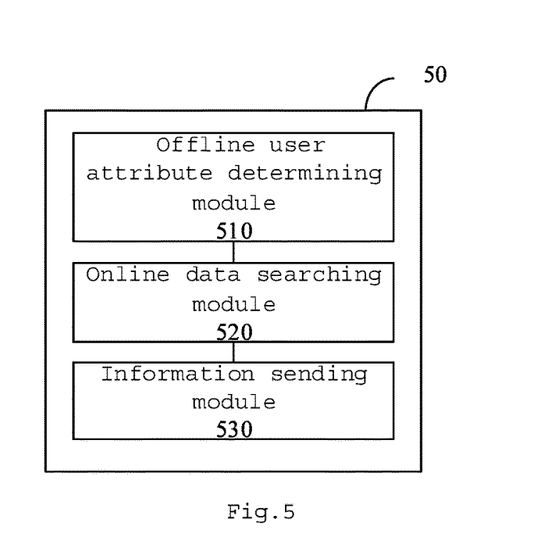
FIG. 5 shows a schematic structural diagram of an information sending apparatus according to some embodiments of the present disclosure.

FIG. 5 is a block diagram of some embodiments of an information sending apparatus according to the present disclosure. As shown in FIG. 5, the apparatus 50 of the embodiments comprises: an offline user attribute determining module 510, an online data searching module 520 and an information sending module 530.

The offline user attribute determining module 510 is configured to analyze video data of an offline user to determine an attribute of the offline user;

The online data searching module 520 is configured to search for historical access information of at least one online user matching the attribute of the offline user.

In some embodiments, the at least one online user is at least one online user of which a distance from a location of the offline user is within a first preset range; or the attribute of each of the at least one online user is determined from an image of the online user acquired on an online platform and registration information of the online user on the online platform.

The information sensing module 530 is configured to determine at least one object recommended to the offline user according to the historical access information of each of the at least one online user, and send information of the at least one object to the offline user.

Figure 6:
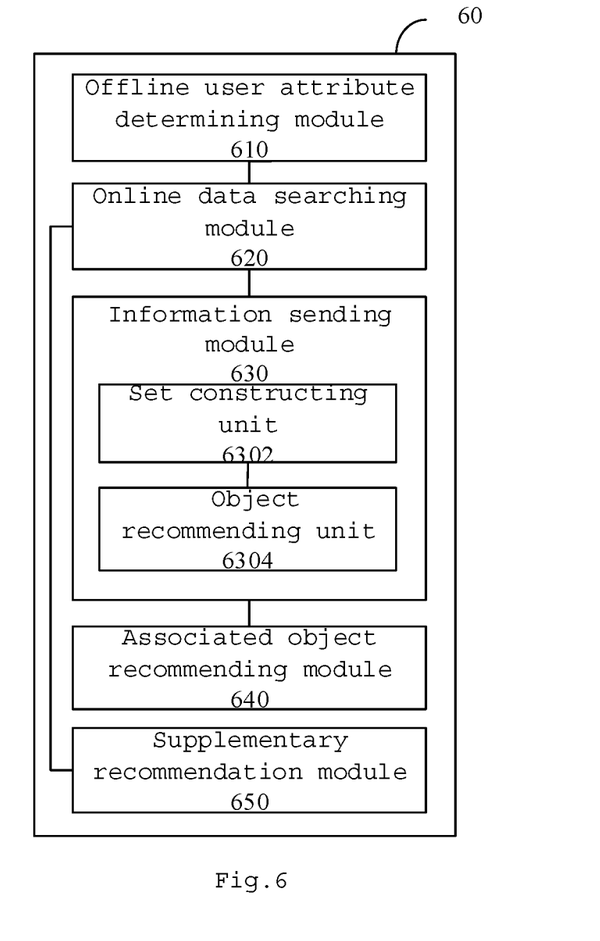
FIG. 6 shows a schematic structural diagram of an information sending apparatus according to some other embodiments of the present disclosure.

FIG. 6 is a block diagram of some other embodiments of an information sending apparatus according to the present disclosure. As shown in FIG. 6, the apparatus 60 of the embodiments comprises: an offline user attribute determining module 610, an online data searching module 620 and an information sending module 630, which are similar to the offline user attribute determining module 510, the online data searching module 520 and the information sending module 530 in the preceding embodiments, respectively.

The information sensing module 630 comprises: a set constructing unit 6302 and an object recommending unit 6304.

The set constructing unit 6302 is configured to construct an object recommendation set according to at least one object historically accessed by each of the at least one online user.

In some embodiments, the set constructing unit 6302 is further configured to select at least one object, to which the number of times of access exceeds a corresponding threshold from objects historically accessed by each of the at least one online user, to construct the object recommendation set. The number of times of access is determined from at least one of the number of times of browsing, the number of times of purchase, the number of times of share, the number of times of comment, or the number of collections.

In some embodiments, the set constructing unit 6302 is further configured to determine at least one candidate user group with similar access behaviors to a basic user group formed by the at least one online user as at least one additional user group and expand the object recommendation set according to the historical access information of the at least one additional user group, after constructing the object recommendation set. All online users of an online platform are divided into different online user groups according to attribute, and the at least one candidate user group is at least one online user group not matching the basic user group in attribute.

Further, the set constructing unit 6302 is further configured to for each candidate user group, determine a behavior similarity between the candidate user group and the basic user group, according to the number of same objects preferred by the candidate user group and the basic user group and the total number of objects respectively preferred by the candidate user group and the basic user group and determine at least one candidate user group the behavior similarity between which and the basic user group exceeds a behavior similarity threshold as the at least one additional user group. Each of the objects preferred by the candidate user group is an object, to which the recommendation metric value of the candidate user group exceeds a recommendation metric value threshold, and each of the objects preferred by the basic user group is an object, to which the recommendation metric value of the basic user group exceeds the recommendation metric value threshold.

In some embodiments, the set constructing unit 6302 is further configured to for each recommended object in the object recommendation set, determine at least one candidate object similar to the recommended object as at least one additional object, according to the recommendation metric value of each candidate object and add the at least one additional object into the object recommendation set to expand the object recommendation set. The candidate object is an object accessed by an online user not matching the attribute of the offline user.

Further, the set constructing unit 6302 is further configured to for each candidate object, determine a similarity between the candidate object and the recommended object according to the number of user groups preferring the candidate object, the number of user groups preferring the recommended object and the number of user groups preferring both the candidate object and the recommended object and at least one candidate object, the similarity between which and the recommended object exceeds an object similarity threshold as the at least one additional object. The number of the user groups preferring the candidate object is the number of user groups of which the recommendation metric value to the candidate object exceeds the recommendation metric value threshold, and the number of user groups preferring the recommended object is the number of user groups of which the recommendation metric value to the recommended object exceeds the recommendation metric value threshold.

The object recommending unit 6304 is configured to determine the at least one object recommended to the offline user according to a recommendation metric value of each object in the object recommendation set.

In some embodiments, the recommended metric value of each object is determined from at least one of the number of times of access to the object, feedback information from the at least one online user to the object, a habit matching degree of the object with the offline user, or a price of the object. The higher the number of times access to the object, the higher the recommendation metric value of the object; the better the feedback from the at least one online user to the object, the higher the recommendation metric value of the object; the higher the habit matching degree of the object with the offline user, the higher the recommendation metric value of the object; the lower the price of the object, the higher the recommendation metric value of the object.

In some embodiments, the apparatus 60 further comprises: an associated object recommending module 640 configured to select at least one object associated with the attribute of the offline user, and recommending the at least one object to the offline user.

In some embodiments, the information sending module 630 is further configured to send at least one of the attribute of the offline user or the recommended object to a display device for display.

In some embodiments, the apparatus 60 further comprises: a supplementary recommendation module 650 configured to, determine at least one recommended object according to historical access information of at least one online user, of which a distance from a display device is within a second preset range, and sending the at least one recommended object to the display device for display, in a case that there is no offline user or the attribute of the offline user cannot be determined.

The information sending apparatus in the embodiments of the present disclosure may each be implemented by various computing devices or computer systems, which are described below in conjunction with FIGS. 7 and 8.

Figure 7:
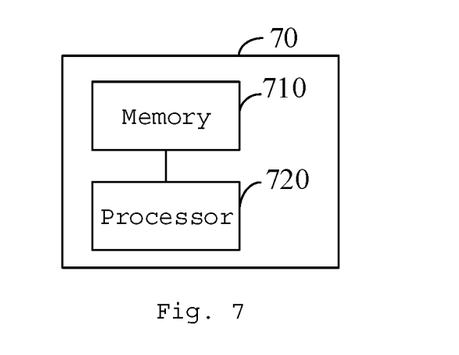
FIG. 7 shows a schematic structural diagram of an information sending apparatus according to further embodiments of the present disclosure.

FIG. 7 is a block diagram of some embodiments of an information sending apparatus according to the present disclosure. As shown in FIG. 7, the apparatus 70 in the embodiments comprises: a memory 710 and a processor 720 coupled to the memory 710, the processor 720 configured to perform the information sending method in any of the embodiments of the present disclosure based on instructions stored in the memory 710.

The memory 710 may include, for example, system memory, fixed non-volatile storage medium, and the like. The system memory stores, for example, an operating system, an application program, a Boot Loader, a database, and other programs.

Figure 8:
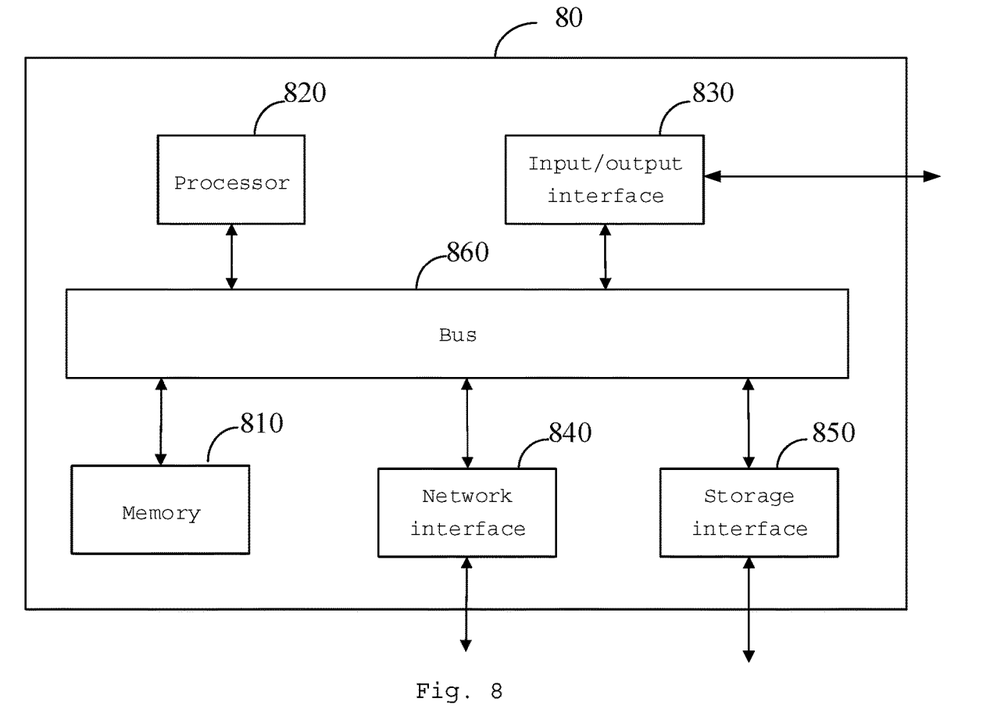
FIG. 8 shows a schematic structural diagram of an information sending apparatus according to still further embodiments of the present disclosure.

FIG. 8 is a block diagram of some other embodiments of an information sending apparatus according to the present disclosure. As shown in FIG. 8, the apparatus 80 in the embodiments comprises: a memory 810 and a processor 820 which are similar to the memory 710 and the processor 720, respectively. Input/output interface 830, network interface 840, storage interface 850, etc. may also be comprise. These interfaces 830, 840, 850, as well as the memory 810 and the processor 820, may be connected via a bus 860, for example. The input/output interface 830 provides a connection interface for input/output devices such as a display, a mouse, a keyboard, and a touch screen. The network interface 840 provides a connection interface for various networking devices, to be connected to for example a database server or a cloud storage server. The storage interface 850 provides a connection interface for external storage devices such as an SD card and a USB disk.

Figure 9:
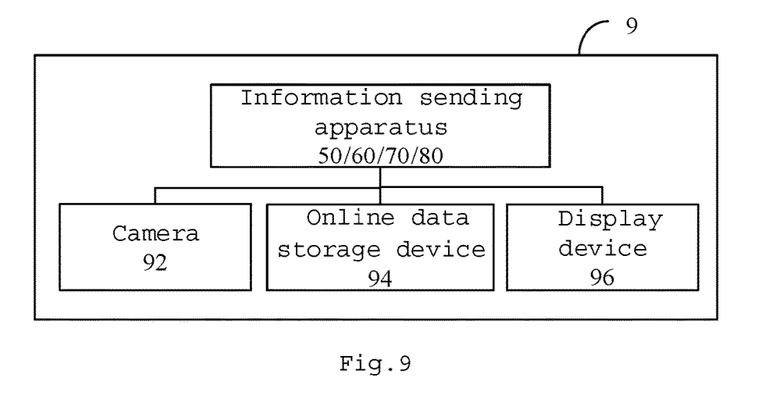
FIG. 9 shows a schematic structural diagram of an information sending system according to some embodiments of the present disclosure.

The present disclosure further provides an information sending system, and as shown in FIG. 9, the system 9 in the embodiment comprises: the information transmitting apparatus 50, 60, 70 or 80 in the preceding embodiments, a camera 92, and the display device 96.

The camera 92 is configured to acquire the video data of the offline user and input the video data into the information sending apparatus.

The display device 96 is configured to receive at least one of the attribute of the offline user or the at least one object recommended to the offline user outputted by the information sending apparatus, and display it to the offline user.

The system 9 may further comprise: an online data storage device 94 configured to store attributes and historical access information of online users, and provide an interface to the information sending apparatus, so that the information sending apparatus searches for the historical access information of at least one online user matching the attribute of the offline user.

The system 9 may further comprise: a log recording module configured to record a log including information such as user attribute value, recommended object, time point, and store the log into a log database; and a report generating module configured to periodically generate a report according to a log generator, for the convenience of subsequent feedback and update of the system.

As will be appreciated by one of skill in the art, the embodiments of the present disclosure may be provided as a method, system, or computer program product. Accordingly, the present disclosure may take the form of an entirely hardware embodiment, an entirely software embodiment or an embodiment combining software and hardware aspects. Furthermore, the present disclosure may take the form of a computer program product embodied on one or more computer-available non-transitory storage medium (including, but not limited to, disk storage, CD-ROM, optical storage, and so forth) having computer-available program code therein.

The present disclosure is described with reference to flowcharts and/or block diagrams of the method, apparatus (system), and computer program products according to the embodiments of the present disclosure. It will be understood that each flow and/or block of the flowchart and/or block diagram, and combinations of flows and/or blocks in the flowchart and/or block diagram, can be implemented by computer program instructions. These computer program instructions may be provided to a processor of a general purpose computer, a special purpose computer, an embedded processor, or other programmable data processing apparatuses to produce a machine, such that the instructions, when executed by the processor of the computer or other programmable data processing apparatuses, create means for implementing functions specified in one or more flow in the flowchart and/or one or more block in the block diagram.

These computer program instructions may also be stored in a computer-readable memory that can direct the computer or other programmable data processing apparatuses to function in a particular manner, such that the instructions stored in the computer-readable memory produce an article of manufacture including instruction means which implement the functions specified in one or more flow in the flowchart and/or one or more block in the block diagram.

These computer program instructions may also be loaded onto the computer or other programmable data processing apparatuses to cause a series of operational steps to be performed on the computer or other programmable apparatuses to produce a computer implemented process, such that the instructions executed on the computer or other programmable apparatuses provide steps configured to implement the functions specified in one or more flow in the flowchart and/or one or more block in the block diagram.

The above only describes preferred embodiments of the present disclosure but is not intended to limit the present disclosure, and any modification, equivalent, improvement and the like made within the spirit and scope of the present disclosure are intended to be included within the scope of protection of the present disclosure.

What is claimed is:

1. An information sending method, comprising:
analyzing video data of an offline user to determine an attribute of the offline user;
searching for historical access information of at least one online user matching the attribute of the offline user; and
determining at least one object recommended to the offline user according to the historical access information of each of the at least one online user, and sending information of the at least one object to the offline user,
wherein determining at least one object recommended to the offline user according to the historical access information of each of the at least one online user comprises:
constructing an object recommendation set according to at least one object historically accessed by each of the at least one online user; and
determining the at least one object recommended to the offline user according to a recommendation metric value of each object in the object recommendation set.

2. The information sending method according to claim 1, wherein constructing an object recommendation set according to at least one object historically accessed by each of the at least one online user comprises:
selecting at least one object, to which the number of times of access exceeds a corresponding threshold from objects historically accessed by each of the at least one online user, to construct the object recommendation set,
wherein the number of times of access is determined from at least one of the number of times of browsing, the number of times of purchase, the number of times of share, the number of times of comment, or the number of collections.

3. The information sending method according to claim 1, wherein the method further comprises: after constructing the object recommendation set,
determining at least one candidate user group with similar access behaviors to a basic user group formed by the at least one online user as at least one additional user group, wherein all online users of an online platform are divided into different online user groups according to attribute, and the at least one candidate user group is at least one online user group not matching the basic user group in attribute; and
expanding the object recommendation set according to the historical access information of the at least one additional user group.

4. The information sending method according to claim 3, wherein determining at least one candidate user group with similar access behaviors to a basic user group formed by the at least one online user as at least one additional user group comprises:
for each candidate user group, determining a behavior similarity between the candidate user group and the basic user group, according to the number of same objects preferred by the candidate user group and the basic user group and the total number of objects respectively preferred by the candidate user group and the basic user group; and
determining at least one candidate user group, the behavior similarity between which and the basic user group exceeds a behavior similarity threshold as the at least one additional user group,
wherein each of the objects preferred by the candidate user group is an object, to which the recommendation metric value of the candidate user group exceeds a recommendation metric value threshold, and each of the objects preferred by the basic user group is an object, to which the recommendation metric value of the basic user group exceeds the recommendation metric value threshold.

5. The information sending method according to claim 1, wherein the method further comprises: after constructing the object recommendation set,
for each object as a recommended object in the object recommendation set, determining at least one candidate object similar to the recommended object as at least one additional object, according to the recommendation metric value of each candidate object, wherein the candidate object is an object accessed by an online user not matching the attribute of the offline user; and
adding the at least one additional object into the object recommendation set to expand the object recommendation set.

6. The information sending method according to claim 5, wherein determining at least one candidate object similar to the recommended object as at least one additional object, according to the recommendation metric value of each candidate object comprises: for each candidate object, determining a similarity between the candidate object and the recommended object according to the number of user groups preferring the candidate object, the number of user groups preferring the recommended object and the number of user groups preferring both the candidate object and the recommended object; and
determining at least one candidate object, the similarity between which and the recommended object exceeds an object similarity threshold as the at least one additional object,
wherein the number of the user groups preferring the candidate object is the number of user groups of which the recommendation metric value to the candidate object exceeds the recommendation metric value threshold, and the number of user groups preferring the recommended object is the number of user groups of which the recommendation metric value to the recommended object exceeds the recommendation metric value threshold.

7. The information sending method according to claim 1, further comprising:
selecting at least one object associated with the attribute of the offline user, and recommending the at least one object to the offline user.

8. The information sending method according to claim 1, wherein the recommended metric value of each object is determined from at least one of the number of times of access to the object by the at least one online user, feedback information from the at least one online user to the object, a habit matching degree of the object with the offline user, or a price of the object,
wherein the higher the number of times access to the object, the higher the recommendation metric value of the object; the better the feedback from the at least one online user to the object, the higher the recommendation metric value of the object the higher the habit matching degree of the object with the offline user, the higher the recommendation metric value of the object the lower the price of the object, the higher the recommendation metric value of the object.

9. The information sending method according to claim 1, wherein:
the at least one online user is at least one online user, of which a distance from a location of the offline user is within a first preset range; or
the attribute of each of the at least one online user is determined from an image of the online user acquired on an online platform and registration information of the online user on the online platform.

10. The information sending method according to claim 1, further comprising:
sending at least one of the attribute of the offline user or the at least one object recommended to the offline user to a display device for display.

11. The information sending method according to claim 1, further comprising:
   determining at least one recommended object according to historical access information of at least one online user, of which a distance from a display device is within a second preset range, and sending the at least one recommended object to the display device for display, in a case that there is no offline user or the attribute of the offline user cannot be determined.

12. An information sending apparatus, comprising:
   a processor; and
   a memory coupled to the processor and storing instructions that when executed by the processor, cause the processor to implement the information sending method according to claim 1.

13. A non-transitory computer-readable storage medium storing computer programs, when executed by a processor, cause the processor to implement the information sending method according to claim 1.

14. An information sending system, comprising:
   the information sending apparatus according to claim 12;
   a camera configured to acquire the video data of the offline user and input the video data into the information sending apparatus; and
   a display device configured to receive at least one of the attribute of the offline user or the at least one object recommended to the offline user outputted by the information sending apparatus, and display it to the offline user.

15. The information sending system according to claim 14, further comprising:
   an online data storage device configured to store attributes and historical access information of online users, and provide an interface to the information sending apparatus, so that the information sending apparatus searches for the historical access information of at least one online user matching the attribute of the offline user.

16. The information sending apparatus according to claim 12, wherein constructing an object recommendation set according to at least one object historically accessed by each of the at least one online user comprises:
   selecting at least one object, to which the number of times of access exceeds a corresponding threshold from objects historically accessed by each of the at least one online user, to construct the object recommendation set,
   wherein the number of times of access is determined from at least one of the number of times of browsing, the number of times of purchase, the number of times of share, the number of times of comment, or the number of collections.

17. The information sending apparatus according to claim 12, wherein the memory further storing instructions which, when executed by a processor, cause the processor to: after constructing the object recommendation set,
   determine at least one candidate user group with similar access behaviors to a basic user group formed by the at least one online user as at least one additional user group, wherein all online users of an online platform are divided into different online user groups according to attribute, and the at least one candidate user group is at least one online user group not matching the basic user group in attribute; and
   expand the object recommendation set according to the historical access information of the at least one additional user group.

18. The information sending apparatus according to claim 17, wherein determining at least one candidate user group with similar access behaviors to a basic user group formed by the at least one online user as at least one additional user group comprises:
   for each candidate user group, determining a behavior similarity between the candidate user group and the basic user group, according to the number of same objects preferred by the candidate user group and the basic user group and the total number of objects respectively preferred by the candidate user group and the basic user group; and
   determining at least one candidate user group, the behavior similarity between which and the basic user group exceeds a behavior similarity threshold as the at least one additional user group,
   wherein each of the objects preferred by the candidate user group is an object, to which the recommendation metric value of the candidate user group exceeds a recommendation metric value threshold, and each of the objects preferred by the basic user group is an object, to which the recommendation metric value of the basic user group exceeds the recommendation metric value threshold.

19. An information sending method, comprising:
   analyzing video data of an offline user to determine an attribute of the offline user;
   searching for historical access information of at least one online user matching the attribute of the offline user; and
   determining at least one object recommended to the offline user according to the historical access information of each of the at least one online user, and sending information of the at least one object to the offline user;
   wherein the at least one online user is at least one online user, of which a distance from a location of the offline user is within a first preset range; or the attribute of each of the at least one online user is determined from an image of the online user acquired on an online platform and registration information of the online user on the online platform.

20. An information sending method, comprising:
   analyzing video data of an offline user to determine an attribute of the offline user;
   searching for historical access information of at least one online user matching the attribute of the offline user;
   determining at least one object recommended to the offline user according to the historical access information of each of the at least one online user, and sending information of the at least one object to the offline user; and
   determining at least one recommended object according to historical access information of at least one online user, of which a distance from a display device is within a second preset range, and sending the at least one recommended object to the display device for display, in a case that there is no offline user or the attribute of the offline user cannot be determined.

\* \* \* \* \*